United States Patent

Farber et al.

Patent Number: 5,819,284
Date of Patent: Oct. 6, 1998

[54] PERSONALIZED REAL TIME INFORMATION DISPLAY AS A PORTION OF A SCREEN SAVER

[75] Inventors: James M. Farber, Rumson; Bruce Lowell Hanson, Little Silver; Kenneth M. Huber, Red Bank; David Richard Morehead, Morganville; Marina L. Roesler, Westfield, all of N.J.

[73] Assignee: AT&T Corp., Middletown, N.J.

[21] Appl. No.: 409,579

[22] Filed: Mar. 24, 1995

[51] Int. Cl.⁶ ..................................................... G06F 17/30
[52] U.S. Cl. ................................. 707/104; 707/10; 707/4; 345/329; 348/7; 84/609
[58] Field of Search .............................. 395/600, 59, 610, 395/2.87, 604; 455/89; 358/84, 86; 379/95.1, 207; 348/9, 7, 1; 380/20; 364/514, 443; 84/609; 707/104, 10, 4; 345/329

[56] References Cited

U.S. PATENT DOCUMENTS

| | | | |
|---|---|---|---|
| 4,677,434 | 6/1987 | Fascenda | 380/20 |
| 4,745,559 | 5/1988 | Willis et al. | 364/514 |
| 5,105,184 | 4/1992 | Pirani et al. | 345/115 |
| 5,131,020 | 7/1992 | Liebesny et al. | 379/59 |
| 5,321,750 | 6/1994 | Nadan | 380/20 |
| 5,327,554 | 7/1994 | Palazzi, III et al. | 395/600 |
| 5,347,632 | 9/1994 | Filepp et al. | 395/200 |
| 5,379,421 | 1/1995 | Palazzi, III et al. | 395/600 |
| 5,404,505 | 4/1995 | Levinson | 395/600 |
| 5,465,401 | 11/1995 | Thompson | 455/89 |
| 5,512,935 | 4/1996 | Majeti et al. | 348/9 |
| 5,524,146 | 6/1996 | Morrisey et al. | 379/207 |
| 5,614,940 | 3/1997 | Cobbley et al. | 348/7 |
| 5,748,190 | 5/1998 | Kjorsvik | 345/329 |

OTHER PUBLICATIONS

"Moon Valley's Netcruiser C D and More", Newsbyte News Network, Nov. 16, 1994.

"New Tools Transform the Internet Experience: Search–Engine Vendors are Moving into Net Broadcasting", Computer Reseller News, pp. IR17, Feb. 1997.

(List continued on next page.)

Primary Examiner—Thomas G. Black
Assistant Examiner—Charles L. Rones

[57] ABSTRACT

Information "feeds" received from multiple information sources are aggregated, re-formatted and stored in a personalized real time information display system. When the display system receives a request from a user having a personal computer or other similar display device, the system is arranged to respond with information needed to display a screen saver that includes personalized, up to date information, such as traffic, weather and sports, that is of interest to that particular user. Each user has a personalized user profile indicating (a) the categories or types of information that the user desires to receive, such as sports information, weather, investment advisories, and so on, and (b) parameters that specify, for that user, the exact information desired to be received in each category. If the user's personal computer display has remained inactive for a predetermined period of time, the screen saver is activated, causing the personal computer to access the service node, and after interchange of prestored user identification and password data, retrieve information, obtained by the system from a variety of sources, based on the user's individual profile. The retrieved information is displayed on the screen without interrupting the screen saver function, and the displayed personalized data is thereafter updated in the same manner, at user-specified time intervals.

34 Claims, 4 Drawing Sheets

OTHER PUBLICATIONS

"Freeloader: Freeloader Releases 2.0", M2 Presswire, Oct. 1996.

Anis, Nick, "Energizer Bunny Screen Saver Patent Claim Overturned", Newsbytes, Dec. 1994.

"News to the Desktop: Vendors Deliver Personalized News to Users Via the Net", CommunicationsWeek, pp. IA01, Apr. 1996.

"Freeloader Releases Version 2.0; High Bandwidth, Personalized Web Content Delivered Offline to PC Desktops With Redesigned Interface and Screen Saver", Business Wire pp. 090301268, Sep. 1996.

Groves, Martha "Patent Office Deals Second Blow in Segment of Software", LA Times, Business Section, p. 2, Dec. 1994.

Trivette, Donald B. "Energizer Bunny Screen Saver", PC Magazine, v 12, n 6, p. 450, Mar. 1993.

Evans, James "The Cutting Edge: Computing/Technology/Innovation Intellectual Properties Patent Policies on Trial Law: Screen–Saving Bunny Case Raises Concerns About Using the Media to Pressure a U.S. Agency", LA Times, Section:D, p. 4, Jul. 1994.

"Screen Savers for Sports Fans", Newsbytes, Nov. 1993.

Rohrbough, Linda "Energizer Bunny Software Program Threatened by Patent", Newsbytes, Apr. 1994.

"A Wide Area Network Information Filter", M. F. Whyl, 11453 First Intern. Conference on Artificial Intelligence Applications on Wall Street, 9–11 Oct. 1991, New York, NY US.

"Evolving Agents For Personalized Information Filtering", B. Sheth and P. Maes, The Ninth Conference on Artificial Intelligence for Applications, Mar. 1–5, 1993, Orlando, Florida.

"Assembler Program for the Macintosh", A. Schirmacher, Mikrocomputer Zeitschrift, Aug. 1987, West Germany, No. 8, ISSN 0720–4442, pp. 76–79.

PERSONALIZED REAL TIME INFORMATION DISPLAY AS A PORTION OF A SCREEN SAVER

FIELD OF THE INVENTION

This invention relates generally to the provision and display of information, and, in particular, to a system and method for personalizing a screen saver display on a personal computer (PC) or other visual display device, so that the screen saver display is periodically changed to include current up-to-date information related to items that interest the user of the PC.

BACKGROUND OF THE INVENTION

A user having a display device such as a personal computer (PC) (or a similar visual display device such as a screen telephone), often will employ a screen saver to display pictorial information on the device when the device has remained inactive for a predetermined period of time. While the screen saver can be personalized to cause various time-varying patterns to be displayed, thereby avoiding burn-in on the screen surface, the display does not itself convey useful information to the user.

SUMMARY OF THE INVENTION

In accordance with the present invention, information "feeds" received from multiple information sources are aggregated, re-formatted and stored in a service node that may be disposed in, and thus be a part of, a telecommunications network, or, alternatively, that may be outside of the network, but that is accessed through the telecommunications network. When the service node receives a request from a user having a personal computer or other similar display device, the service node is arranged to respond with information needed to display a screen saver that includes personalized, up to date information, such as traffic, weather and sports, that is of interest to that particular user.

When a user initially arranges to use the present invention, a personalized user profile is established, indicating (a) the categories or types of information that the user desires to receive, such as sports information, weather, investment advisories, and so on, and (b) parameters that specify, for that user, the exact information desired to be received in each category. If the user's personal computer display has remained inactive for a predetermined period of time, the screen saver is activated, causing the personal computer to access the service node. The screen saver application transmits user identification and password data, previously stored in the screen saver application, to the service node. The PC requests information from the service node, which information was obtained by the service node from a variety of sources, based on the user's individual profile. The service node formats the information for display on the user's device, the information is transmitted from the service node to the PC, and the retrieved information is displayed on the device without interrupting the screen saver function. The displayed personalized data is thereafter updated in the same manner, by arranging the personal computer to make periodic requests for information. Accordingly, the information that is displayed as a screen saver is always "current".

In accordance with one aspect of the present invention, the service node includes several clients in an information feed interface that, in effect, insulates information providers from direct connection to users, and assures that any necessary formatting and "publishing" changes required for display by the users' display system are made. In accordance with another aspect of the invention, information obtained from providers is digested and stored/arranged in individual databases within the service node, so that the information is available for efficient user access. In accordance with another aspect of the present invention, pre-established user profiles are maintained in the service node, in order to enable retrieval and display of the desired information. However, the system is arranged to make intelligent selection of "default" profiles, based on factors that can be ascertained even about a new user, such as the user's location from which a request is initiated. This allows the system to customize information even for users who have not pre-specified a profile.

BRIEF DESCRIPTION OF THE DRAWINGS

The present invention will be more fully appreciated by consideration of the following detailed description which should be read in light of the accompanying drawing in which.

DETAILED DESCRIPTION

Figure 1:
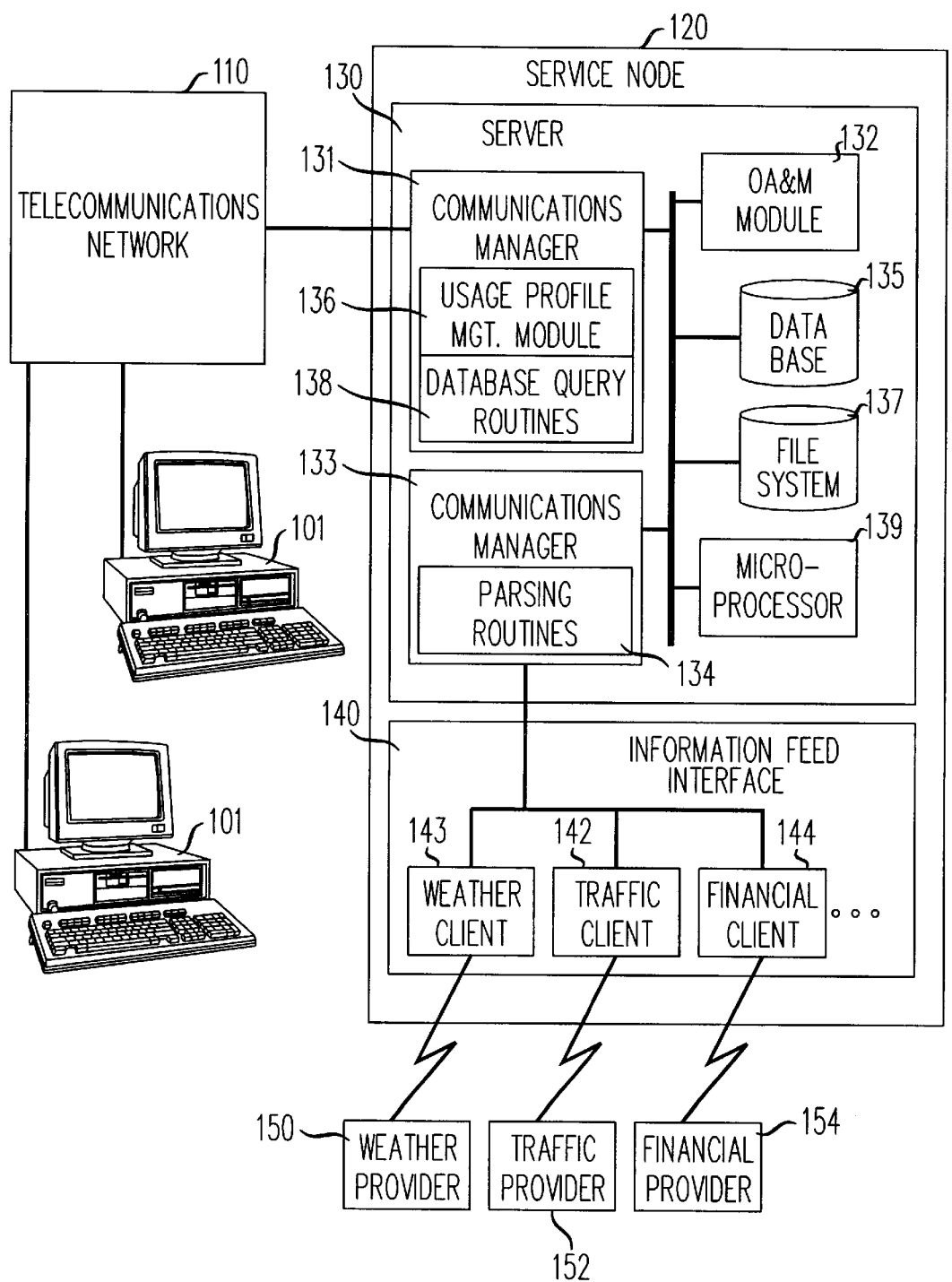
FIG. 1 is a block diagram illustrating the overall arrangement of the present invention and the environment in which the invention operates.

Referring first to FIG. 1, there is shown a block diagram illustrating the overall arrangement of the present invention and the environment in which the invention operates. A service node, designated generally as 120, is arranged to provide a plurality of users having personal computers 101 (or other terminals with visual display capability), with personalized, up to date information, such as traffic, weather and sports, that is of interest to each particular user, that can be displayed as a screen saver when the personal computer remains idle for a predetermined period of time. Representative multimedia terminals other than the personal computers 101 shown in FIG. 1 can include a screen phone, such as a Picturephone™ 2500 available from AT&T™ Corp., a television equipped with a set top box (such as the TV Information Center available from AT&T™ Corp.) providing an interactive capability, or a personal digital assistant, such as a MagicLink™ personal digital assistance available from Sony.

Personal computers 101 are connected to service node 120 through a telecommunications network 110, which may include switches and other elements in local exchange carrier networks as well as interexchange carrier networks. In some embodiments of the present invention, service node 120 may be disposed within telecommunications network 110, and thus be part of either a local exchange carrier network or an interexchange carrier network.

As shown in FIG. 1, service node 120 includes a server 130 and an information feed interface 140. Server 130 is connected to personal computers 101 through telecommunications network 110, and provides the information needed to provide a display on the PC's of the type illustrated in FIG. 4 that is described in more detail below. Information feed interface 140 is connected to server 130 as well as to a plurality of information providers that may be at different remote locations. As explained below, these information providers may include, for example, a weather provider 150, a traffic provider 152 and a financial information provider 154. Commercial TCP/IP networking software may be used to provide the communications interface between server 130 and information feed interface 140.

Server 130, which may be a workstation such as the Sparc™ 20 available from Sun MicroSystems™, is arranged to perform various processes, including parsing the information received from information providers and storing the parsed data in a database, as well as other functions described below, using a microprocessor 139 operating under the control of programs stored in a file system 137. Microprocessor 139 has access to information stored in a database 135, which stores information of the types illustrated in FIG. 2, discussed below. Information and instructions are communicated between microprocessor 139 and personal computers 101 using a first communications manager 131, which acts as a communications interface and protocol converter. Communications manager 131 includes usage profile management module 136, that provides system usage information needed for administration and billing purposes for each user. Communications manager 131 also includes database query routines 138 that are used to gain access to user data and stored information pertinent to each user. A second communication manager 133 provides a communications interface between server 130 and information feed interface 140. Communication manager 133 includes parsing routines 134 in order to break-down the information received from information feed interfaces 140 into addressable data fields (e.g., date, time, location, traffic report) and then store the data fields in the appropriate portion of database 135. Operations, administration, and maintenance (OA&M) routines 132 are also provided in server 130. These routines operate, administer, and maintain service node 120. This allows a system operator to monitor the status of service node 120, perform software/data backups and restorations, resolve operating alarms, provide usage data required for billing, and so on.

Communications manager 131 implements a data link communications protocol and an applications protocol for communication with personal computers 101 or any other multimedia terminal that is employed as an end user device. The data link communications protocol defines how "bits" are packaged, while the applications protocol defines how to interpret the bits (i.e., what is the information). This includes provision of user applications that format user application generated data so that it can be understood and displayed by the personal computer or other end user device. Formatting may be accomplished using a language such as HyperText Markup Language (HTML) commonly used by the World Wide Web.

Server 130 also includes a file system 137, which contains information and programs necessary to control and operate service node 120.

Information feed interface 140 includes a plurality of clients 142–144, each of which provide an interface to a corresponding one of the information providers 150, 152 and 154. Thus, weather client 143 is connected to and interfaces with weather provider 150, traffic client 142 is connected to and interfaces with traffic provider 152, and financial client 144 is connected to and interfaces with financial information provider 154. Each of the clients 142–144 include local processors that may be configured in one of several ways. First, the clients may periodically connect to the associated information provider and download information that is available from the provider. In this configuration, the clients can also answer calls from an information provider and receive information sent by the provider. In an alternative configuration, the clients may maintain a continuous communications link to the information provider, and either download information (service node initiated) or receive information (provider initiated). Clients 142–144 may be implemented in commercially available personal computers using commercially available communications software, such as Procomm-Plus™. In either event, the client arrangement in effect insulates information providers from direct connection to users, and assures that any necessary formatting and "publishing" changes required for display by the users display system are made.

It is to be noted here that the arrangement of 110 shown in FIG. 1 is illustrative only, and that the precise connection between the personal computers 101 or other multimedia terminal equipment used by any user and service node 120 will also depend upon the communications facility that is available to interconnect that user with service node 120. What is essential to the present invention is that information "feeds" received from multiple information sources are aggregated, re-formatted and stored in the service node, for later access by a user. For example, if a particular user has an ISDN terminal, the user may be connected directly to server 130 via an ISDN line.

Figure 2:
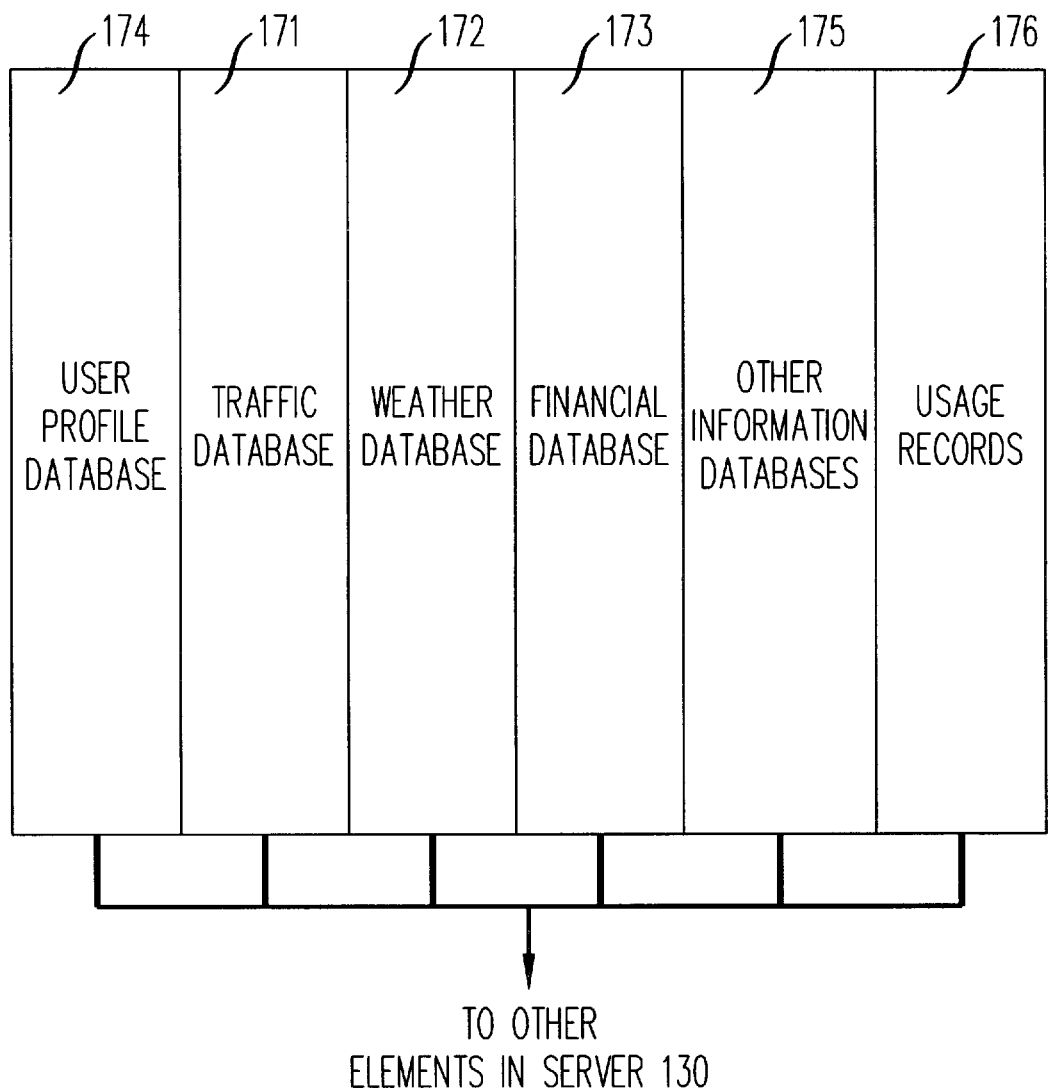
FIG. 2 is a block diagram illustrating the arrangement of database 135 within server 130 of FIG. 1.

Referring now to FIG. 2, there is shown a block diagram illustrating the arrangement of database 135 within server 130 of FIG. 1. Generally speaking, server 130 includes a plurality of individual databases such as traffic database 171, weather database 172, and financial database 173, containing information obtained from the various information providers. Other information databases 175 may also be provided, depending upon the types of information that is available from information providers and thus can be offered to users of the system. Database 135 also contains other databases such as a user profile database 174 and usage records 176. User profile database 174 contains information for each user of the system, specifying (a) the categories or types of information services that are to be provided to that user, and (b) for those information services, the parameters that are associated with the desired information. For example, a first user may desire traffic, financial and sports information, a second user may desire weather and news information, and a third user may desire traffic, news and weather. For each of these three users, the detailed information desired may be different. Thus, the first user may desire traffic information for certain roadways, financial information for certain securities, and sports information for particular teams. The second user may desire to obtain some of the same types of information, but the details will be different. In this example, the second user may desire local news and weather for City A, while the third user may desire news and weather for a different location, City B. The database management system in server 130 may be implemented using a commercially available relational database management system, such as Informix®.

Figure 3:
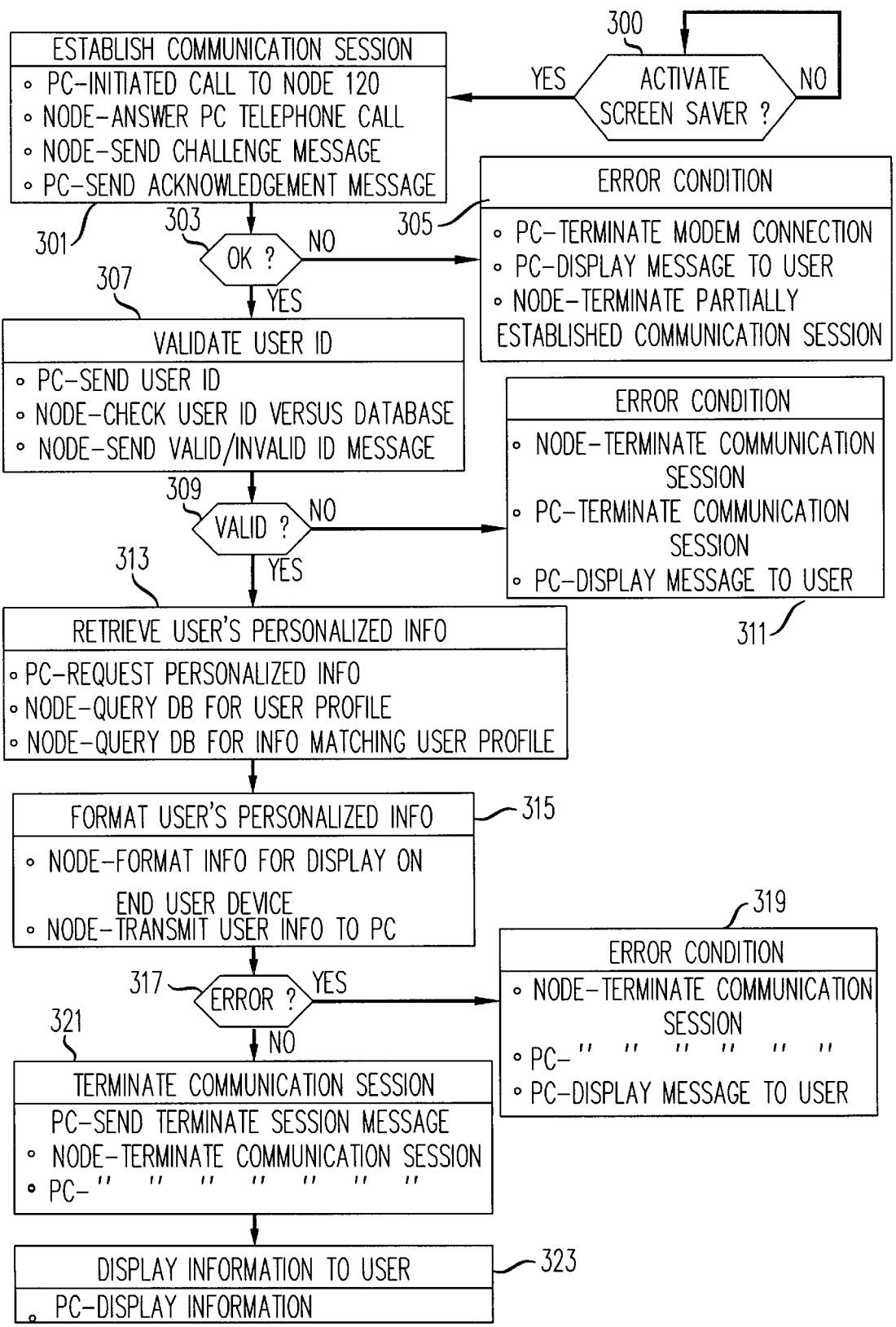
FIG. 3 is a flow diagram illustrating one embodiment of the process used to provide customized, up to date information to a personal computer end user device.

Referring now to FIG. 3, there is shown a flow diagram illustrating one embodiment of the process used to provide customized, up to date information to a personal computer end user device 101 that accesses service node 120. Each block in FIG. 3 identifies the operations performed by personal computer 101 and by service node 120 to provide the functionality contemplated by the present invention. The steps in the process assure that when the system receives a request from a screen saver application running on a personal computer or other similar display device, the system can respond with information needed to display a screen saver that includes personalized, up to date information, such as traffic, weather and sports, that is of interest to that particular user.

The process begins in step 300, in which a determination is made as to whether the screen saver is activated, such that it requires information from the present invention. If a NO result is obtained, indicating that the screen saver is not activated, the process loops, such that step 300 is repeated until a YES result is obtained. This loop will generally continue until a user-specified period of PC inactivity has elapsed (e.g., five minutes).

When a YES result occurs in step 300, the screen saver is activated and the process for retrieving current up-to-date data is initiated by proceeding to step 301, in which a communication session is established between personal computer 101 and service node 120. This step may also be triggered after the screen saver has been active for a user-specified period of time (e.g., fifteen minutes). In both cases personal computer 101 is arranged to generate a query or transmit a message to service node 120, typically by dialing a predefined telephone number. Service node 120 is arranged to answer the call and send a "challenge" message to personal computer 101. In turn, personal computer 101 responds with an acknowledgment message, which is sent back to service node 120.

Once a communication session is established in step 301, a determination is made in step 303 as to whether two-way communications are enabled between personal computer 101 and service node 120. If not, an error condition exists, and the process proceeds to step 305, in which personal computer 101 terminates the connection to service node 120 and displays an appropriate error message to the user. Concurrently, service node 120 terminates the partially established communication session. At this point, the PC screen saver may attempt to re-initiate communications, as by repeating the process of step 301.

If a YES result is obtained in step 303, the process proceeds to step 307, in which the user identification number (ID) is validated, or another validation process is performed. In this step, personal computer 101 sends the prestored user ID to service node 120, whereupon service node 120 checks the ID against stored information in database 135 to determine its validity. Depending upon the outcome, service node 120 sends a valid ID or invalid ID message to personal computer 101.

It is to be noted here that information is stored in database 135 when a user initially arranges to use the display system of the present invention. At that time, a personalized user profile is established, indicating (a) the categories or types of information that the user desires to receive, such as sports information, weather, investment advisories, and so on, and (b) parameters that specify, for that user, the exact information desired to be received in each category. The profile may be created in a number of ways, such as by communicating with an interactive voice platform such as a Conversant® voice response system available from AT&T Corp., or by using a PC application to select desired service options.

If the ID transmitted by the PC screen saver is not valid, the process continues with a NO result in step 309 and proceeds to step 311, where the error condition is dealt with. In that step, both personal computer 101 and service node 120 terminate the existing communications session, and personal computer 101 displays an appropriate message to the user.

If the ID transmitted by the PC screen is valid, the process continues with a YES result in step 309 and proceeds to step 313, in which the user's personalized information is retrieved from data base 135. In this step, personal computer 101 requests the personalized information from service node 120, service node 120 accesses the user's profile, and queries data base 135 for the specific information desired by this user, based upon the profile information.

Next, in step 315, the user's personalized information is appropriately formatted. In this step, the information retrieved in step 313 is actually transmitted from service node 120 to personal computer 101.

In step 317, a determination is then made as to whether an error condition has occurred with respect to the retrieval, formatting and transmission of information to the user. If a YES result is obtained, indicating an error, the process proceeds to step 319, which, like step 311, results in both personal computer 101 and service node 120 terminating the existing communications session, and personal computer 101 displaying an appropriate message to the user.

Following step 317, if an error condition has not occurred, the process proceeds to step 321, in which the communication session between service node 120 and personal computer 101 is terminated. In this step, personal computer 101 sends a terminate session message to service node 120, whereupon service node 120 and personal computer 101 both terminate the communication session. In step 323, the information retrieved in step 313 and formatted in step 315 is displayed on the user's personal computer 101, in the context of the PC screen saver without interrupting the screen saver function.

It is important to note that the screen saver function remains active throughout all the steps illustrated in FIG. 3 and that all these steps take place automatically, that is without user input.

Figure 4:
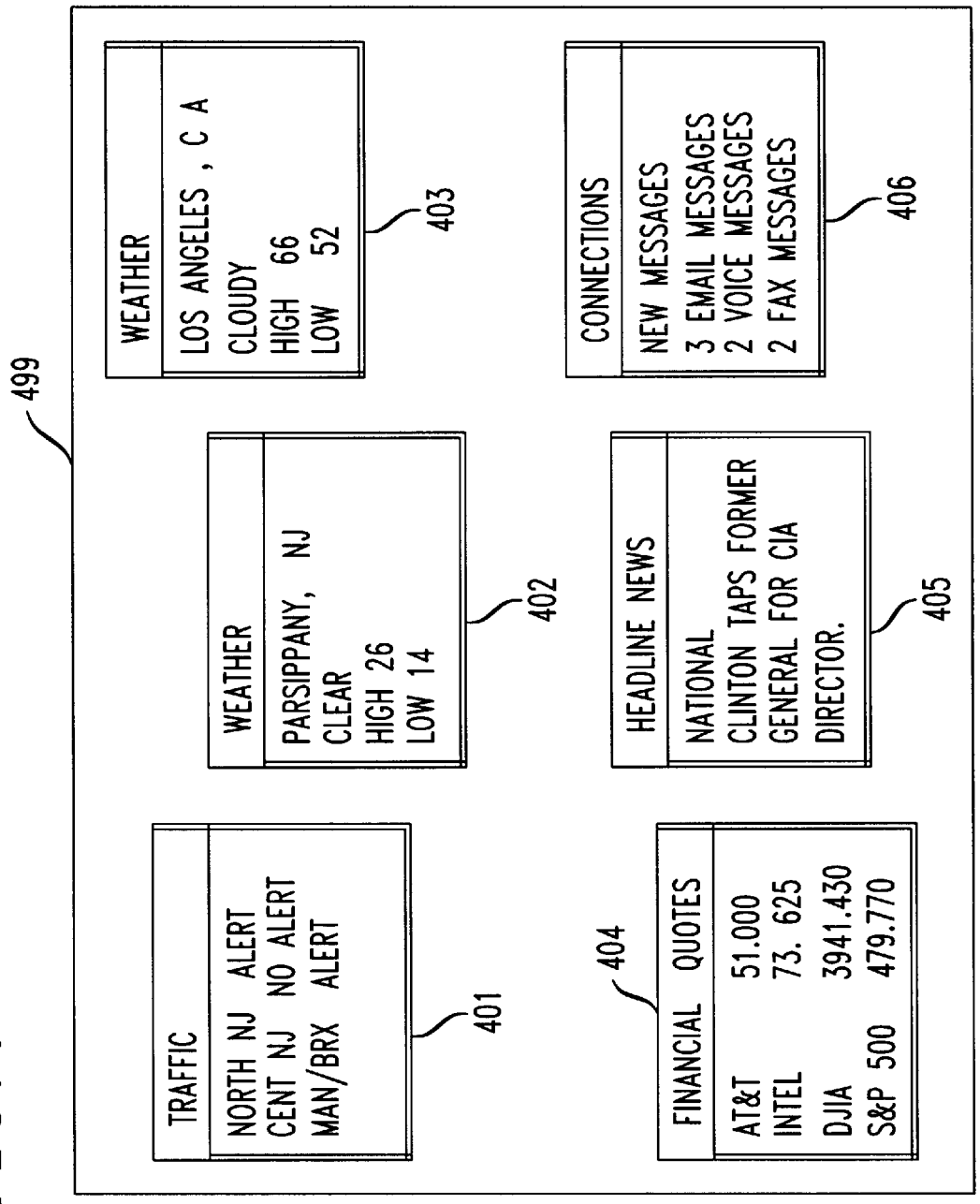
FIG. 4 is an example of an "At-A-Glance" screen saver display which integrates personalized information obtained from a variety of user-specified services using the present invention.

Referring now to FIG. 4, there is shown an example of an "At-A-Glance" screen saver display which integrates personalized information obtained from a variety of user-specified services using the present invention. The display integrates information from a variety of user-specified services, and presents the user with valuable information without being required to navigate through a series a menus. As shown, a series of screen areas 401–406 "float" or randomly move throughout the display area 400, preferably without interfering with or covering each other. Each of the display areas contain different information, relating to topics selected by the user, including, in this example, weather (areas 402 and 403), traffic (area 401), news (area 405), financial (area 404) and other information (area 406), in this case pertaining to communications messages waiting for the user. The information displayed in areas 401–406 is up-to-date, since it was recently obtained from service node 120, and it is customized, in that the information within each of the areas 401–406 was selected by the user and set forth in his or her profile. As the data is updated, the screen saver remains active and the screen saver motion is not interrupted. Numerous variations of the screen saver user presentation are possible.

Various modifications and adaptations of the present invention will be apparent to persons skilled in the art. For example, instead of pre-stored profiles for individual users, the system can be arranged to make intelligent selection of "default" profiles, based on factors that can be ascertained even about a new user, such as the user's location from which a request is initiated. Thus, a user calling service node from a telephone located in New Jersey will, unless different information is requested, automatically receive information about traffic and weather conditions in New Jersey. This allows the system to customize information even for users who have not stored or pre-specified a profile. Accordingly, it is intended that the invention be limited only by the appended claims.

What is claimed is:

1. A server system comprising:
   a first memory storing information received from a plurality of information sources;
   a second memory maintaining a user profile containing preferences for information content expressed by a user of a remotely located electronic device having a visual display, said device being coupled to a communication network, wherein said user profile further contains information identifying said device so that said information content may be transmitted thereto in a format appropriate for display thereon;
   an interface coupled to the communication network; and
   a processor, coupled to said memory and said interface, for controlling the transmission of signals to said remote device in accordance with said user profile, said signals representing at least a portion of said information content and being displayable as a screen saver on the remote display of said device.

2. The system of claim 1 wherein said information content pertains to information comprising one or more of news, sports, weather, or financial information.

3. The system of claim 1 wherein said information identifying the device comprises an application program for formatting the display of information.

4. The server of claim 1 wherein said user profile includes a designation of an event upon whose occurrence said information content is to be transmitted.

5. The server of claim 4 wherein said event is a prescribed time interval.

6. The server of claim 4 wherein said event is receipt of updated information.

7. A system for communicating information to at least one device having a visual display, said device using said information to create varying image patterns of a screen saver, comprising:
   a first memory for storing user preferences for information;
   a database;
   an information feed interface arranged to obtain information from one or more information providers and to store said information in said database; and
   a server that includes a communication manager for down-loading at least a portion of said information to the device in accordance with said user preferences so that said portion of the information is displayable on said display as the screen saver; and
   a second memory for storing information identifying the device so that said information may be transmitted thereto in a format appropriate for display thereon.

8. The system of claim 7 wherein said communications manager downloads different portions of said information to at least two different devices, each having a display, in accordance with different user preferences.

9. The system of claim 7 wherein a portion of information downloaded to each device is selectable by respective users of the devices.

10. The system of claim 7 wherein said information identifying the device comprises an application program for formatting the display of information.

11. A computer readable medium having a computer program encoded thereon, comprising:
   a first portion of said medium having a first program segment for facilitating the selection of preferences for information content to be displayed as part of a screen saver;
   a second portion of said medium having a second program segment for receiving over a communication network information from at least one service provider in accordance with said selected preferences;
   a third portion of said medium having a third program segment for facilitating electronic storage of said information; and
   a fourth portion of said medium having a fourth program segment for displaying at least a portion of said information as a screen saver.

12. The medium of claim 11 wherein said program segment of said fourth portion of said medium facilitates display of said portion of information after a predetermined time of user inactivity has passed.

13. The medium of claim 11 further comprising a fifth portion of said medium specifying default preferences for information content.

14. The medium of claim 13 wherein at least one of said default preferences is based on the location of the display device.

15. The medium of claim 11 wherein said information content pertains to information comprising one or more of news, weather, traffic, sports, or financial information.

16. The medium of claim 11 wherein said program segment of said second portion of said medium facilitates receiving information over said communication network in a format conforming to a formatting language used for the world wide web.

17. The medium of claim 11 wherein said information content reflects up-to-date information.

18. The medium of claim 11 wherein said second portion of said medium comprises a program segment facilitating the receipt of information signals reflecting updated information from said service provider.

19. The medium of claim 18 wherein said information received from said service provider reflects parameters characterizing a user of a computer in which said computer readable medium is utilized.

20. The medium of claim 19 wherein said parameters comprise user location information.

21. The medium of claim 11 further comprising a fifth portion of said medium having a fifth program segment facilitating a periodic request for updated information from said service provider in accordance with the selected preferences.

22. The method of claim 11 wherein said second portion of said medium facilitates receiving information over a communication network that includes a telephone network.

23. A method of operating a personal computer having a visual display, the personal computer coupled to a communication network, the method comprising the steps of:
   a. transmitting over the communication network preferences for information content from a user of said personal computer;
   b. receiving information signals from an information service over the communication network, wherein said information signals reflect said preferences for information content expressed by a user of said personal computer;

c. subsequent to step (b), receiving updated information signals from said information service over the communication network;

d. displaying a screen saver on the visual display of the personal computer, which screen saver reflects select updated information signals from said communication network, said select updated information signals corresponding to at least one transmitted preference for information content; and e. transmitting over the communication network information identifying the personal computer so that information may be transmitted thereto in a format appropriate for display thereon.

24. The method of claim 23 further comprising the steps of determining when time elapsed from the personal computer's last detection of user activity exceeds a threshold, and in response to said determination, performing step (d).

25. The method of claim 23 wherein said information identifying the personal computer comprises an application program for formatting the display of information.

26. A method for displaying updated information on at least one visual display of an electronic device, said method comprising the steps of:

a. maintaining a user profile containing preferences for information content expressed by a user of said device;

b. collecting information that includes a first set of data from a plurality of information sources;

c. storing said collected information in a service node;

d. transmitting at least a portion of said collected information to the device in accordance with said user profile;

e. collecting from said information sources updated information that updates said collected information, said updated information including a second set of data such that the first set of data is rendered outdated by said second set of data; and f. transmitting at least a portion of said updated information to the device in accordance with said user profile to replace a portion of said collected information appearing on the display, wherein the transmitting steps include the step of transmitting different portions of said collected information to different devices in accordance with different user profiles.

27. The method of claim 26 wherein said maintained user profile reflects default preferences for information content.

28. The method of claim 27 wherein at least one of said default preferences is based on the location of the device.

29. The method of claim 26 wherein said information sources comprise one or more of news, weather, traffic, sports, or financial information sources.

30. The method of claim 26 wherein said collected information is transmitted in a format conforming to a formatting language used for the world wide web.

31. The method of claim 26 wherein said maintained user profile includes a preference for financial information.

32. The method of claim 26 wherein said maintained user profile includes a preference for weather information.

33. The method of claim 32 wherein said weather information comprises weather information for individual cities.

34. The method of claim 26 wherein said preferences are updated by the user.

* * * * *